(12) United States Patent
Heo et al.

(10) Patent No.: US 7,697,822 B2
(45) Date of Patent: Apr. 13, 2010

(54) APPARATUS AND METHOD FOR AUTOMATICALLY SELECTING AND RECORDING HIGHLIGHT PORTIONS OF A BROADCAST SIGNAL

(75) Inventors: Jum Suk Heo, Kyungki-Do (KR); Ok-Seob Jeong, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 1505 days.

(21) Appl. No.: 10/159,013

(22) Filed: Jun. 3, 2002

(65) Prior Publication Data

US 2002/0176689 A1 Nov. 28, 2002

Related U.S. Application Data

(63) Continuation of application No. 08/920,002, filed on Aug. 29, 1997, now abandoned.

(30) Foreign Application Priority Data

Aug. 29, 1996 (KR) .............................. 1996-36378

(51) Int. Cl.
*H04N 5/91* (2006.01)
*H04N 7/00* (2006.01)

(52) U.S. Cl. .............................. 386/96; 386/46; 386/83; 386/95

(58) Field of Classification Search .................. 386/46, 386/52, 83, 95, 96, 97, 102, 125, 126; 360/32, 360/72.2; 455/45, 68; 84/600, 609, 601, 84/477 R
See application file for complete search history.

(56) References Cited

U.S. PATENT DOCUMENTS

| 5,053,876 A | 10/1991 | Blissett et al. |
| 5,151,788 A | 9/1992 | Blum |
| 5,210,559 A | 5/1993 | Ohki |
| 5,282,092 A | 1/1994 | Wilhelms |
| 5,454,723 A * | 10/1995 | Horii ....................... 434/307 A |
| 5,497,243 A | 3/1996 | Sakata et al. |
| 5,537,528 A * | 7/1996 | Takahashi et al. |
| 5,561,849 A * | 10/1996 | Mankovitz ................... 455/45 |
| 5,696,866 A * | 12/1997 | Iggulden et al. ............... 386/46 |

(Continued)

FOREIGN PATENT DOCUMENTS

DE 4002646 A1 1/1990

(Continued)

OTHER PUBLICATIONS

German Office Action dated Feb. 17, 1998.

(Continued)

*Primary Examiner*—Thai Tran
*Assistant Examiner*—Hung Q Dang
(74) *Attorney, Agent, or Firm*—Birch, Stewart, Kolasch & Birch, LLP

(57) ABSTRACT

A method and apparatus for automatically selecting and recording a highlight portion of a broadcast signal, which is capable of detecting a highlight code, a voice level, or an image motion in a broadcast signal when a highlight recording mode is set, judging the presence of a highlight portion in the broadcast signal based upon such detection, and automatically recording a thusly judged highlight portion of the broadcast signal, thereby reducing tape consumption and user frustration.

7 Claims, 8 Drawing Sheets

U.S. PATENT DOCUMENTS

| | | | |
|---|---|---|---|
| 5,760,842 A | * | 6/1998 | Song .......................... 348/564 |
| 5,778,137 A | * | 7/1998 | Nielsen et al. ................ 386/68 |
| 5,786,955 A | | 7/1998 | Kori et al. |
| 5,949,954 A | * | 9/1999 | Young et al. .................. 386/83 |
| 5,973,250 A | * | 10/1999 | Zirille et al. .................. 84/600 |
| 6,014,184 A | | 1/2000 | Knee et al. |
| 6,037,986 A | * | 3/2000 | Zhang et al. ........... 375/240.12 |
| 6,049,654 A | | 4/2000 | Furuta et al. |
| 6,091,886 A | | 7/2000 | Abecassis |
| 6,204,886 B1 | | 3/2001 | Yoshimura et al. |
| 6,212,328 B1 | | 4/2001 | Nakamura |

FOREIGN PATENT DOCUMENTS

| | | |
|---|---|---|
| FR | 2674089 | 3/1991 |
| JP | 08010506 | 1/1996 |
| JP | 08098133 | 12/1996 |

OTHER PUBLICATIONS

German Office Action dated Dec. 20, 2000.

\* cited by examiner

APPARATUS AND METHOD FOR AUTOMATICALLY SELECTING AND RECORDING HIGHLIGHT PORTIONS OF A BROADCAST SIGNAL

CROSS-REFERENCE TO RELATED APPLICATIONS

The present application is a non-provisional Continuation application of prior-filed non-provisional U.S. patent application Ser. No. 08/920,002 filed on Jul. 27, 2000 which in turn was a Continued Prosecution application of prior-filed non-provisional U.S. patent application Ser. No. 08/920,002 filed on Aug. 29, 1997 and now abandoned.

BACKGROUND OF THE INVENTION

1. Field of the Invention

The present invention relates to a method and an apparatus for automatically selecting and recording a highlight portion from a broadcast signal onto a recording medium such as a video tape, and in particular to an improved method and apparatus for automatically selecting and recording a highlight portion of a broadcast signal which is capable of selectively recording a highlight portion, thus significantly reducing tape consumption and recording time, especially when recording a lengthy TV program for a long time such as a sports program.

2. Description of the Conventional Art

Generally, a conventional VCR (Video Cassette tape Recorder) has a recording mode, as shown in FIG. 1, in which it records data from a broadcast signal when a recording start signal is inputted, at Step 11 The recording mode normally continues until a recording stop signal is inputted, at Step 13 at which time the recording mode is stopped, at Step 14.

However, in the conventional art, since the recording mode is performed during the time between a recording start time and a recording stop time, an extended time is required for recording a lengthy program such as a sports program. This naturally increases tape consumption and frustrates the viewer who must scroll through the tape in search of the most significant portions of the recorded program.

SUMMARY OF THE INVENTION

Accordingly, it is an object of the present invention to provide a method and an apparatus for automatically selecting and recording highlight portions from a broadcast signal which overcomes the aforementioned problems in the conventional art.

It is another object of the present invention to provide a method and an apparatus for automatically selecting and recording highlight portions of a broadcast signal which is capable of detecting a highlight code, a voice level, or an image motion when a highlight mode is set, detecting a highlight portion or portions, and automatically recording the detected highlight portion(s), thus reducing tape consumption and viewer frustration.

To achieve the above objects, in accordance with a first embodiment of the present invention, there is provided a method and an apparatus for automatically selecting and recording a highlight portion which includes detecting a highlight portion start code and a highlight portion stop code which are inputted together with video and audio signals when a highlight portion recording start signal is inputted.

To achieve the above objects, in accordance with a second embodiment of the present invention, there is provided a method and an apparatus for automatically selecting and recording a highlight portion of a broadcast signal which includes detecting an audio signal level among video and audio signals after a highlight portion recording start signal is inputted, and recognizing a highlight portion by comparing the detected level with a reference level.

To achieve the above objects, in accordance with a third embodiment of the present invention, there is provided a method and an apparatus for automatically selecting and recording a highlight portion which includes detecting a less motion image from the video and audio signals and recognizing the portion with less image motion as a highlight portion.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
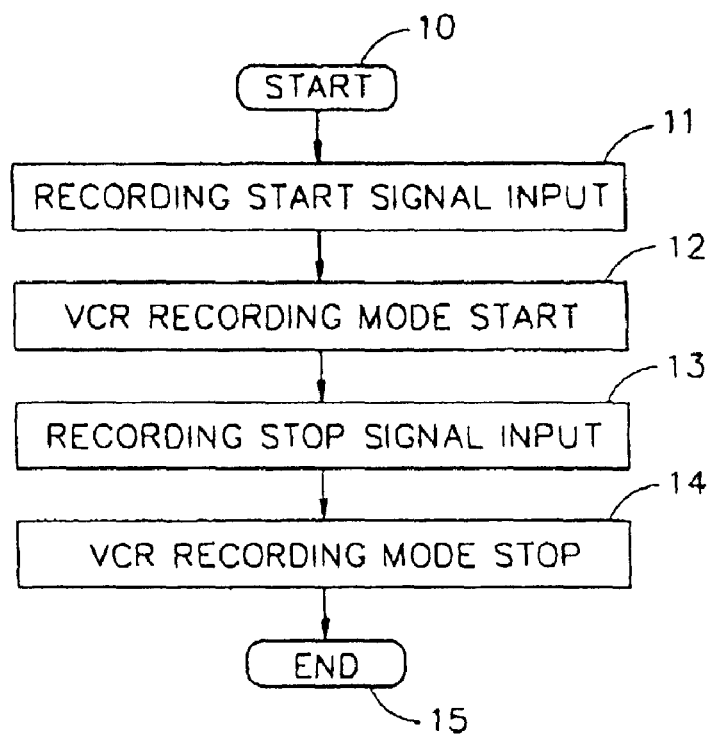
FIG. 1 is a schematic flow chart illustrating a conventional VCR (Video Cassette tape Recorder) signal recording method.
Figure 2:
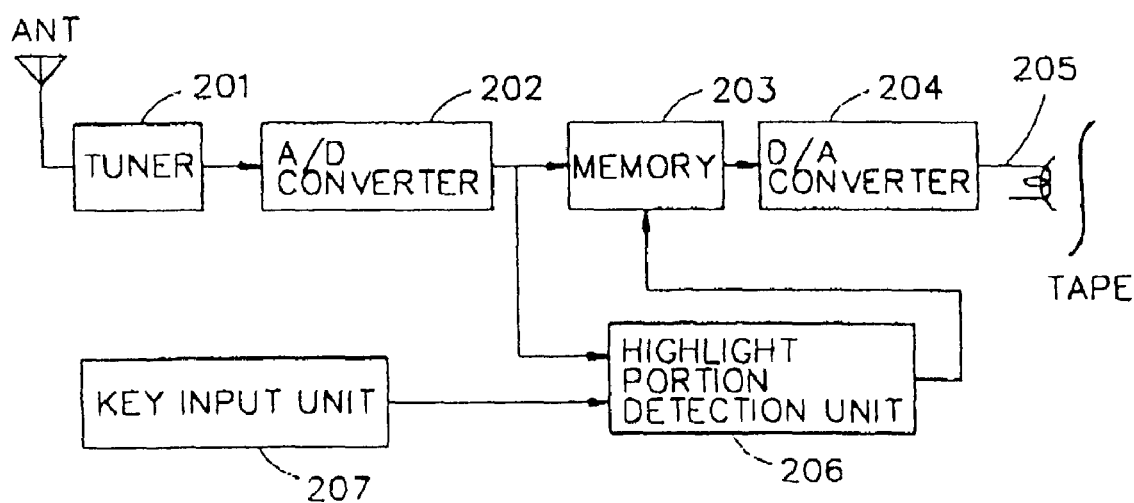
FIG. 2 is a block diagram illustrating an apparatus for automatically selecting and recording a highlight portion of a broadcast signal according to the present invention.

The highlight portion automatic selection and recording apparatus according to the present invention, as shown in FIG. 2, includes a key input unit 207 for setting a highlight mode, a tuner 201 for selecting a broadcast channel signal among multiple broadcast signals, an analog/digital converter 202 for converting an analog signal from the tuner 201 into a digital signal, a memory 203 for storing a digital signal from the analog/digital converter 202 by a predetermined amount (for example, 30 seconds) and outputting the stored signal when a control signal is inputted based on the highlight portion detection, a digital/analog converter 204 for converting a digital signal from the memory 203 into an analog signal, a head 205 for recording an analog signal from the digital/analog converter 204 onto a tape, and a highlight portion detection unit 206 for detecting a highlight portion from the digital signal from the analog/digital converter 202 when the highlight portion recording mode is set by the key input unit 207 and outputting a control signal for controlling a read/write operation of the memory 203. The highlight portion detection unit 206 includes a microcomputer.

The highlight portion automatic selection and recording operation will be explained with reference to the accompanying drawings.

Figure 3:
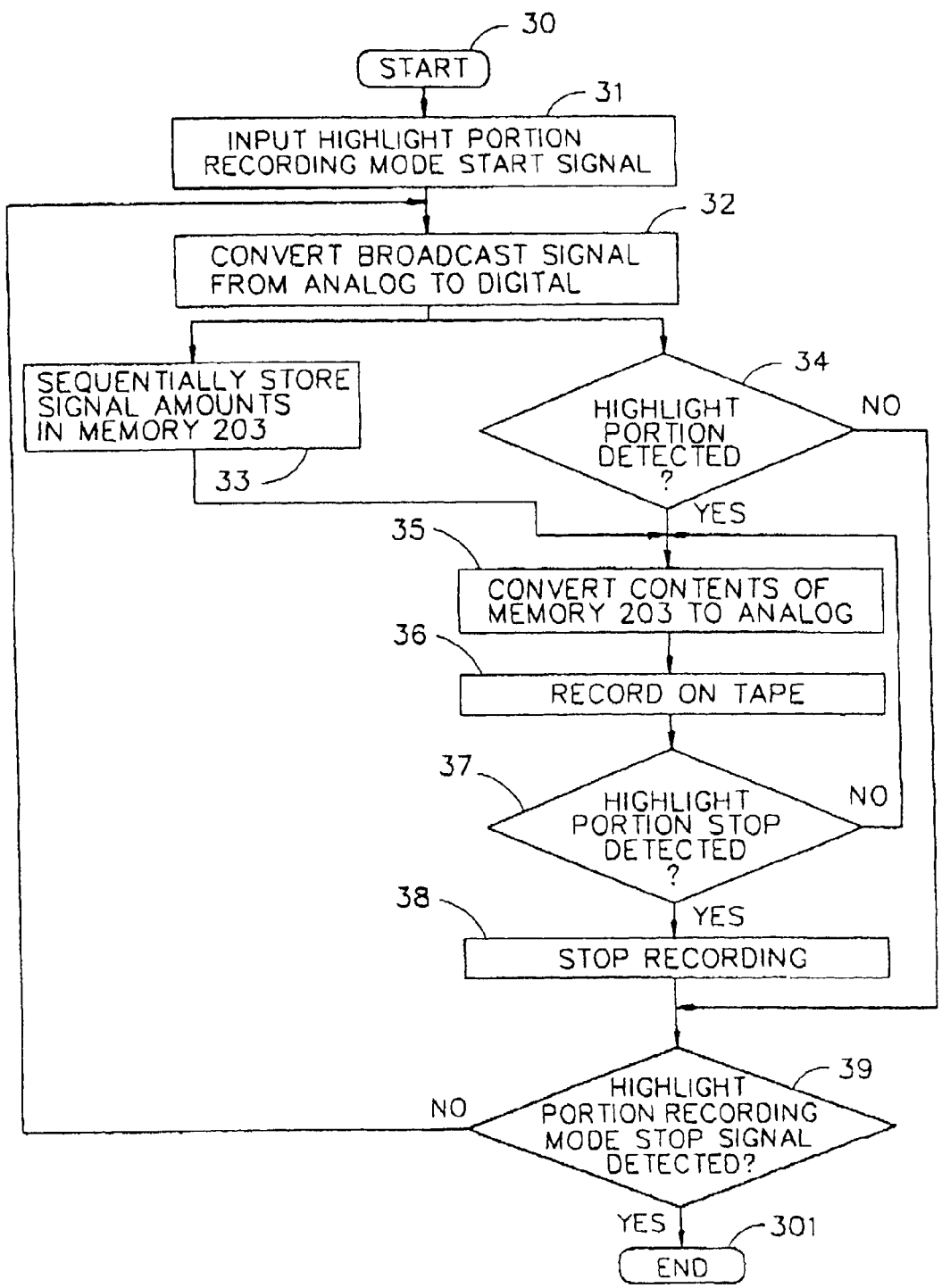
FIG. 3 is a schematic flow chart illustrating a method for automatically selecting and recording a highlight portion of a broadcast signal according to the present invention.

As illustrated in FIG. 3, a highlight portion recording mode start signal is inputted from the key input unit 207, at Step 31. The tuner 201 selects a predetermined broadcast signal from among the multiple broadcast signals received by the antenna ANT. Once selected, the analog/digital converter 202 converts the analog signal from the tuner 201 into a digital signal, at Step 32. A predetermined amount of the selected signal (in one embodiment, the amount is 30 seconds) is stored in the memory 203 as signal amounts, in Step 33. The predetermined amount of memory representing a signal amount can be arbitrarily assigned by the user within the certain limits as determined by the memory size.

At this time, when the highlight portion recording mode start signal is inputted, the highlight portion detection unit 206 recognizes the signal and detects a highlight portion by checking the output signal from the analog/digital converter 202, in Step 34. The above-described steps are continued until a highlight portion recording mode stop signal is inputted to the key input unit 207, at Step 39.

When the highlight portion detection unit 206 detects from an output signal from the analog/digital converter 202 the start of a highlight portion, the highlight portion detection unit 206 outputs a control signal to the memory 203, in Step 34. At this time, when the data stored in the memory 203 is outputted, under the control of the highlight portion detection unit 206, the digital/analog converter 204 converts the signal into an analog signal, at Step 35. The head 205 records the analog signal converted by the digital/analog converter 204 onto a tape, at Step 36.

While the head 205 continuously records the highlight portion, the highlight portion detection unit 206 detects the output signal from the analog/digital converter 202 and judges whether an end of the highlight portion is detected, at Step 37. When the highlight portion detection unit 206 detects that the highlight portion has ended, the process for converting and recording is stopped, at Step 38. Since the outputting of data from the memory 203 is stopped, the operation mode becomes a recording ready mode. The above-described operation continues in the recording ready mode until the highlight portion detection unit 206 detects the start of the next highlight portion. If a highlight portion recording mode stop signal is inputted into the key input unit 207, the highlight portion recording mode operation is stopped, at Step 39.

Figure 4:
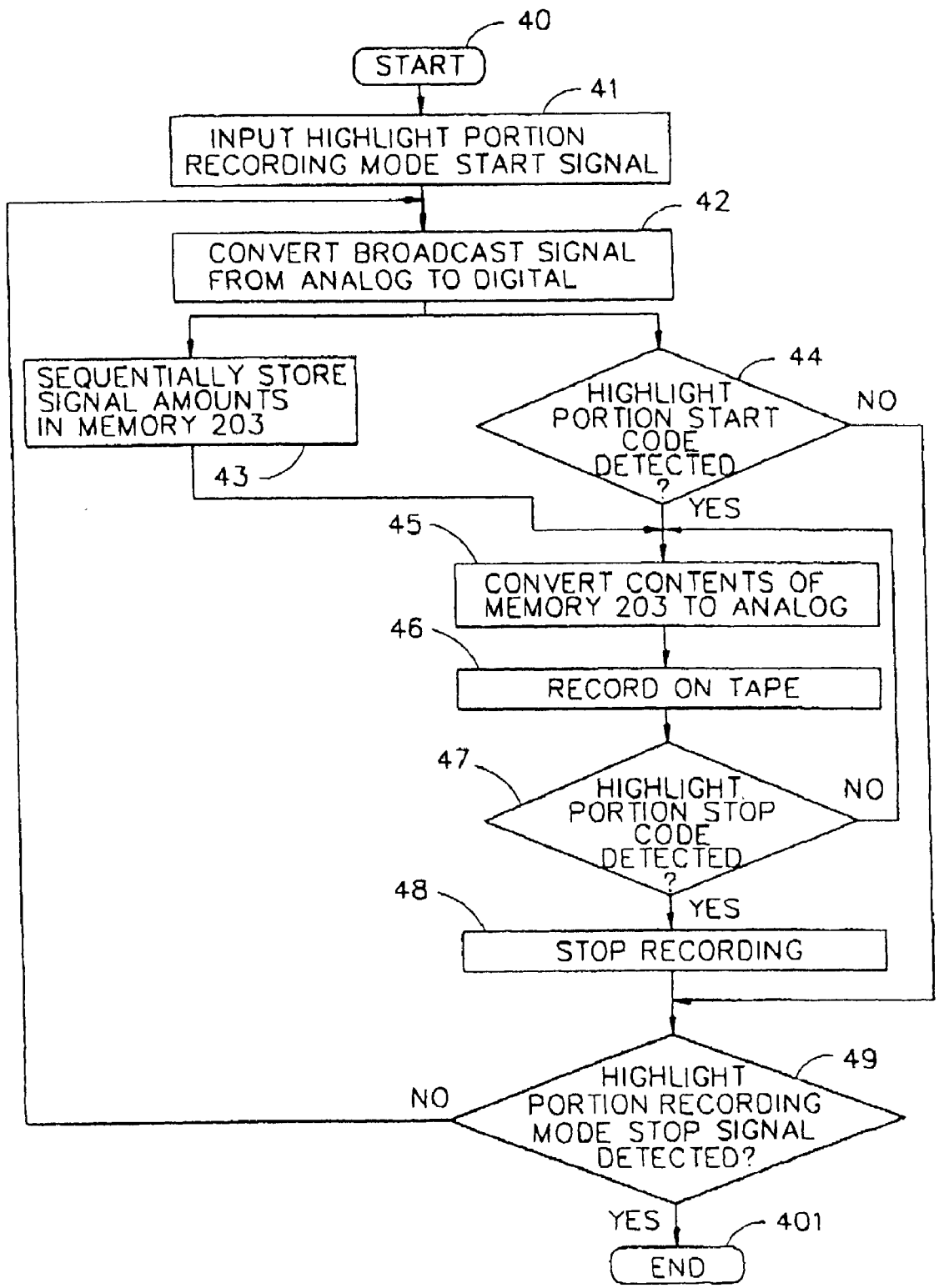
FIGS. 4 and 5 are flow charts illustrating a recording step based on highlight portion code detection.

The operation for detecting and recording the highlight portion(s) based on a highlight portion start code and stop code will now be explained with reference to FIG. 4.

When a highlight portion recording mode start signal is inputted into the key input unit 207, at Step 41, the highlight portion detection unit 206 detects an output signal from the analog/digital converter 202 which converts the output signal from the tuner 201 into a digital signal, at Step 42, and detects a highlight portion start code, at Step 44.

At this time, when the highlight portion detection unit 206 detects a highlight portion start code, the memory 203 stores the output signal from the analog/digital converter 202, at Step 43, and the stored signal is outputted to the digital/analog converter 204, at Step 45.

The digital/analog converter 204 converts the output signal from the memory 203 into an analog signal, and the head 205 records the signals onto the tape, at Step 46.

While the highlight portion recording mode is performed, when the highlight portion detection unit 206 detects a highlight portion stop code, at Step 47, the read/write operation by the memory 203 is stopped.

Therefore, the highlight portion recording operation is stopped, and the operation mode becomes a recording ready mode, at Step 48.

The above-described operations are repeatedly performed as the highlight portion detection unit 206 detects the highlight portion start code from the output signal from the analog/digital converter 202. When a highlight portion recording mode stop signal is inputted into the key input unit 207, the highlight portion recording mode operation is stopped, at Step 49.

Figure 5:
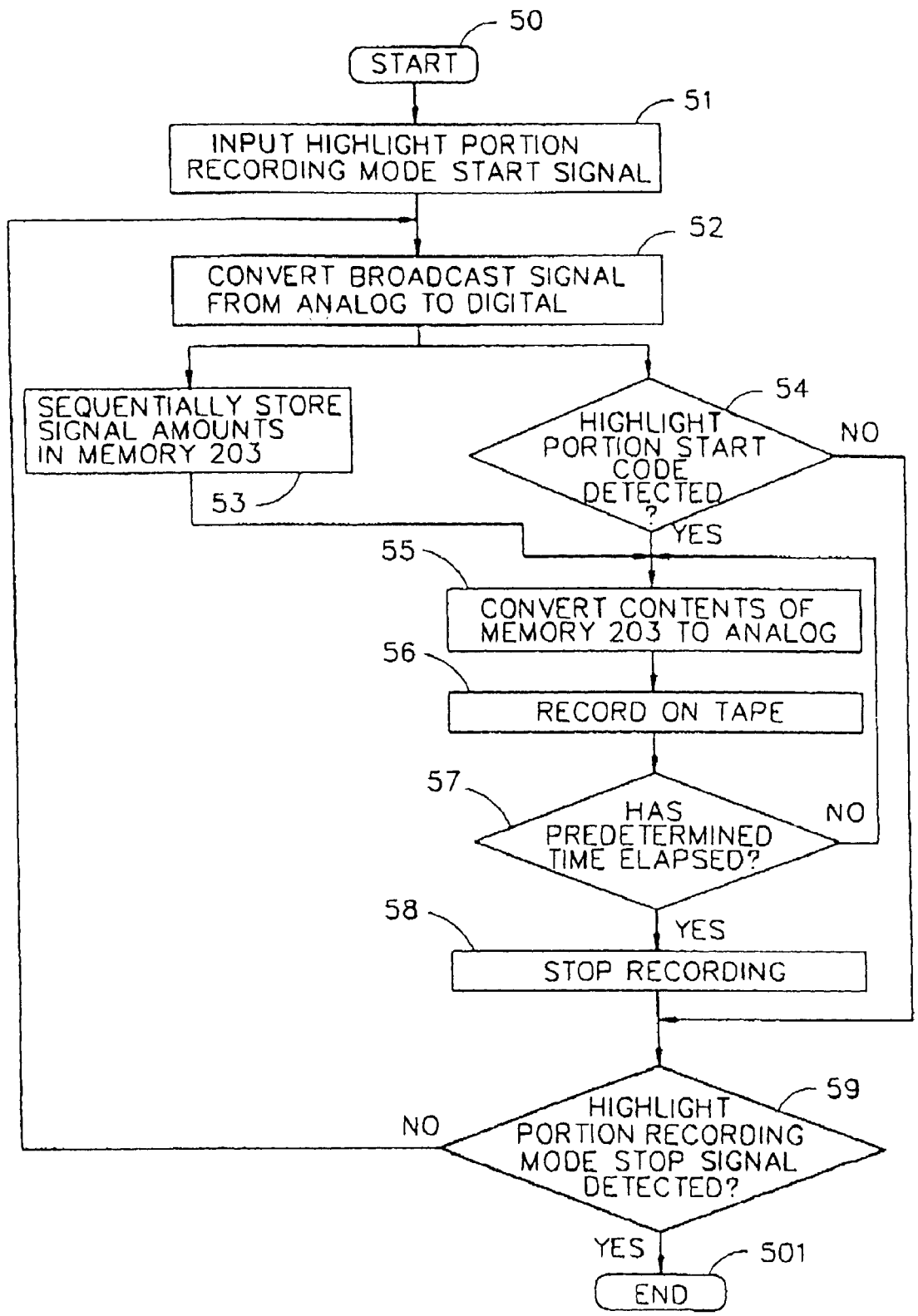

In a second embodiment, the system records a highlight portion upon detecting a highlight portion start code for a predetermined time as shown in FIG. 5. For example, in the case of a live broadcast, the portions which appear after a predetermined time are converted and recorded by using the memory 203.

Namely, when a highlight portion recording mode start signal is inputted into the key input unit 207, at Step 51, the signal corresponding to the broadcast channel selected by the tuner 201 is converted into a digital signal by the analog/digital converter 202, at Step 52, and a predetermined amount of the signal (in one embodiment, the amount is 30 seconds) is stored into the memory 203, at Step 53, and the highlight portion detection unit 206 detects an output signal from the analog/digital converter 202, for thus detecting a highlight portion code, at Step 54.

At this time, when the highlight portion detection unit 206 detects a highlight portion start code from the output signal from the analog/digital converter 202, the contents of memory 203 are converted from digital to analog, at Step 55. Once converted, the head 205 records the signal onto the tape, at Step 56.

Thereafter, the highlight portion detection unit 206 continues the recording operation until a predetermined time has elapsed beginning from when the highlight portion start code was detected, at Step 57. When the recording operation with respect to the highlight portion is stopped, the operation mode becomes a recording ready mode, at Step 58.

The above-described operations are repeatedly performed as the highlight portion detection unit 206 detects an output signal from the analog/digital converter 202 for thus detecting the highlight portion start and stop codes. When the highlight portion recording mode stop signal is inputted into the key input unit 207, the highlight portion detection unit 206 stops the highlight portion recording mode, at Step 59.

Figure 6:
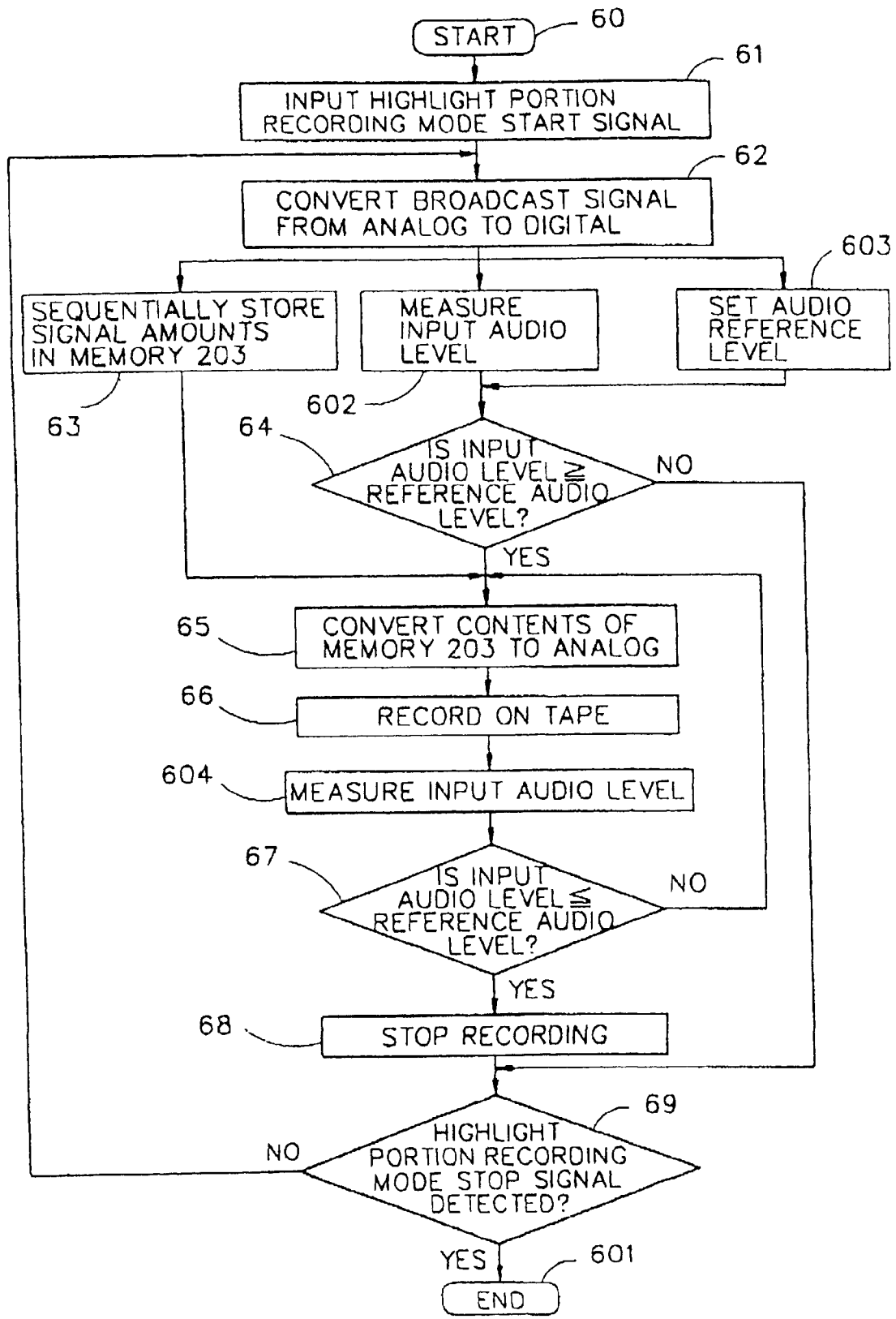
FIG. 6 is a flow chart illustrating a recording step based on audio level detection.

A third embodiment is shown in FIG. 6. At the time of recording a live broadcast signal such as a sports program, the level of an audio signal among the broadcast signal is detected, and the highlight portion is selectively recorded. During a live broadcast of a sports program, the audio levels of an audience response and the voice of an announcer are louder during a highlight portion compared to other portions of a broadcast. In this case, it is possible to detect the increased audio level and for identifying (and recording) the highlight portion.

The highlight portion recording mode start signal is inputted into the key input unit 207, at Step 61. The broadcast signal as selected by the tuner 201 is then converted into a digital signal by the analog/digital converter 202, at Step 62. Thereafter, the signals are stored into the memory 203 by a predetermined amount (for example, the amount is as much as 30 seconds), at Step 63. In this embodiment, the highlight portion detection unit 206 detects an output signal from the analog/digital converter 202, measures the audio level and sets an audio reference level for the audio signal, at Step 603.

At this time, the highlight portion detection unit 206 recognizes the selected portion as a highlight portion when the input audio level is higher than or equal to the audio reference level by a predetermined amount (for example, 5 dBm), at Step 64. If the audio signal is outside the ranges, the highlight portion detection unit 206 begins the record operation. The stored signal is outputted from memory and then converted into an analog signal by the digital/analog converter 204, at Step 65. The converted signals are then recorded onto the tape by the head 205, at Step 66.

Thereafter, the highlight portion detection unit 206 again measures the audio signal level of the output signals, and compares that level with the audio reference signal level, at Step 604. If the audio level is less than the Reference Audio Level, recording is stopped, at Step 68. Otherwise, the process continues.

The above-described operations are repeatedly performed as the highlight portion detection unit 206 checks the output signal from the analog/digital converter 202, measures the audio level, and sets an audio reference level.

Thereafter, while the highlight portion recording mode operation is being performed, when a highlight portion recording mode stop signal is inputted from the key input unit 207, all the operations are stopped, and the highlight portion recording mode operation is stopped, at Step 69.

Figure 7:
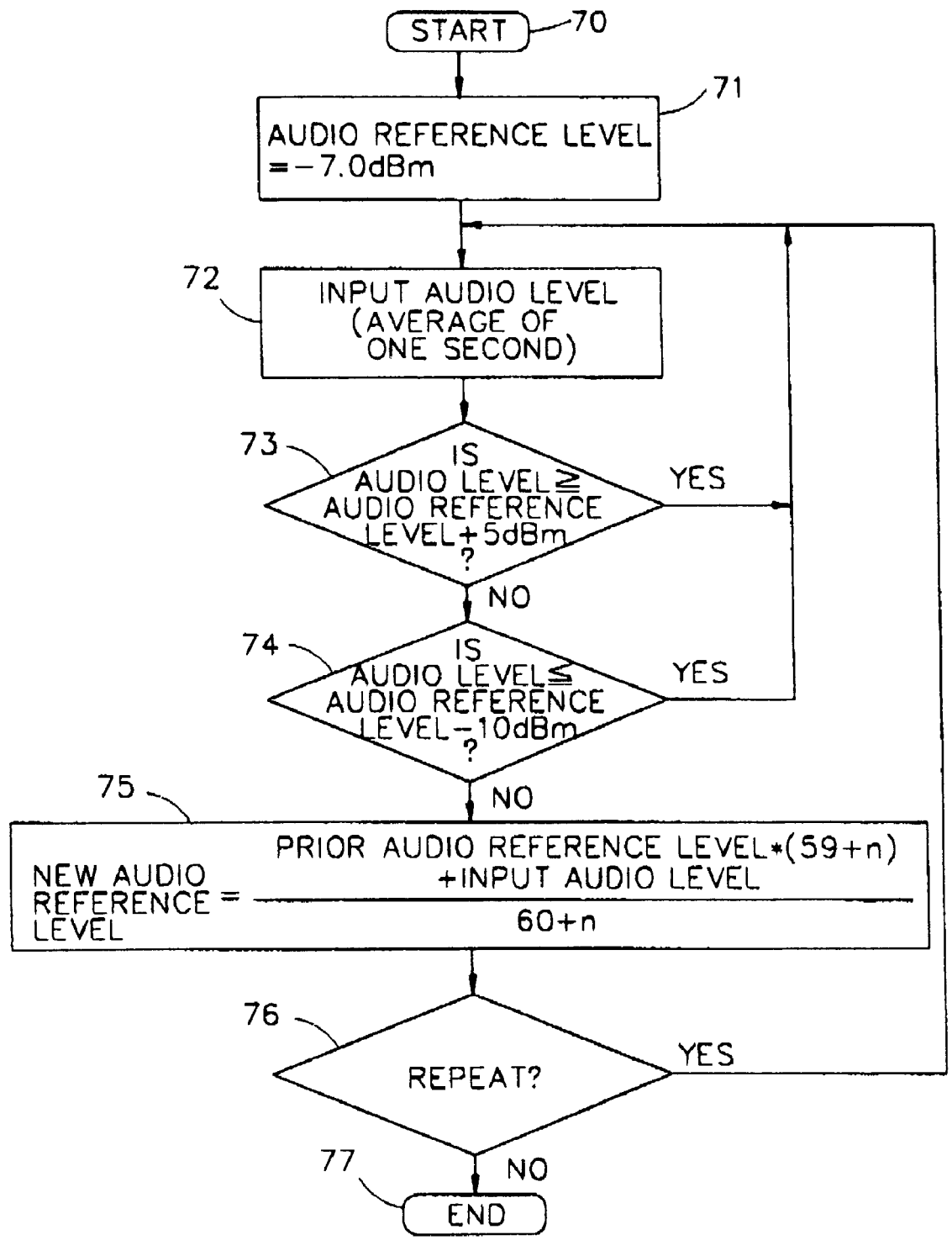
FIG. 7 is a flow chart illustrating an audio reference level setting step as contained in the flow chart of FIG. 6.

The process for setting the audio reference level is illustrated in FIG. 7.

In the audio reference level setting step, at Step 603, the audio reference level is inputted at a level of −7.0 dBm for 60 seconds when the highlight portion recording mode start signal is inputted into the key input, at Step 71. The highlight portion detection unit 206 measures the level of the audio signal from the analog/digital converter 202 and computes an average for one second, at Step 72. In essence, there is a one second delay between the prior input audio level and the current input audio level.

At this time, the highlight portion detection unit 206 compares the input audio level with the audio reference level. If the input audio level is greater than or equal to the audio reference level by 5 dBm, it is judged that the signal is not a normal audio signal input, such that the level of the input audio signal from the analog/digital converter 202 is measured and the process repeated, at Step 73. If the input audio level is not greater than or equal to the audio reference level by 5 dBm, the highlight portion detection unit 206 then compares whether the input audio level is less than or equal to the audio reference level by 10 dBm, at Step 74. If the input audio level is less than or equal to the audio reference level by more than 10 dBm, the highlight portion detection unit 206 judges that the audio signal is not normal, and the operation for determining the level of an input audio contained in the output signal from the analog/digital converter 202 is repeated. If the input audio level is not greater than or equal to the audio reference level by 5 dBm nor less than or equal to the same by 10 dBm, the highlight portion detection unit 206 judges the signal as a normal audio input and recalculates the audio reference level using the following formula:

$$\text{New Audio Reference Level} = \frac{\text{Present Audio Reference Level} \times (59+n) + \text{Input Audio Level}}{(60+n)}$$

where "n" is an arbitrary number, at Step 75. The product of this formula is a weighted average of the inputted audio signal for use as an audio reference level. The process is continuously repeated, as at Step 76, so long as the system is in the highlight recording mode. Using the aforementioned method, a new audio reference level is recalculated every second except when the input audio level is outside the range as detected as an abnormal input.

Based on the above expression, once an audio reference level resetting operation is completed, the highlight portion detection unit 206 detects an audio level of the signal from the analog/digital converter 202, and compares the detected level with the audio reference level for identifying a highlight portion.

Figure 8:
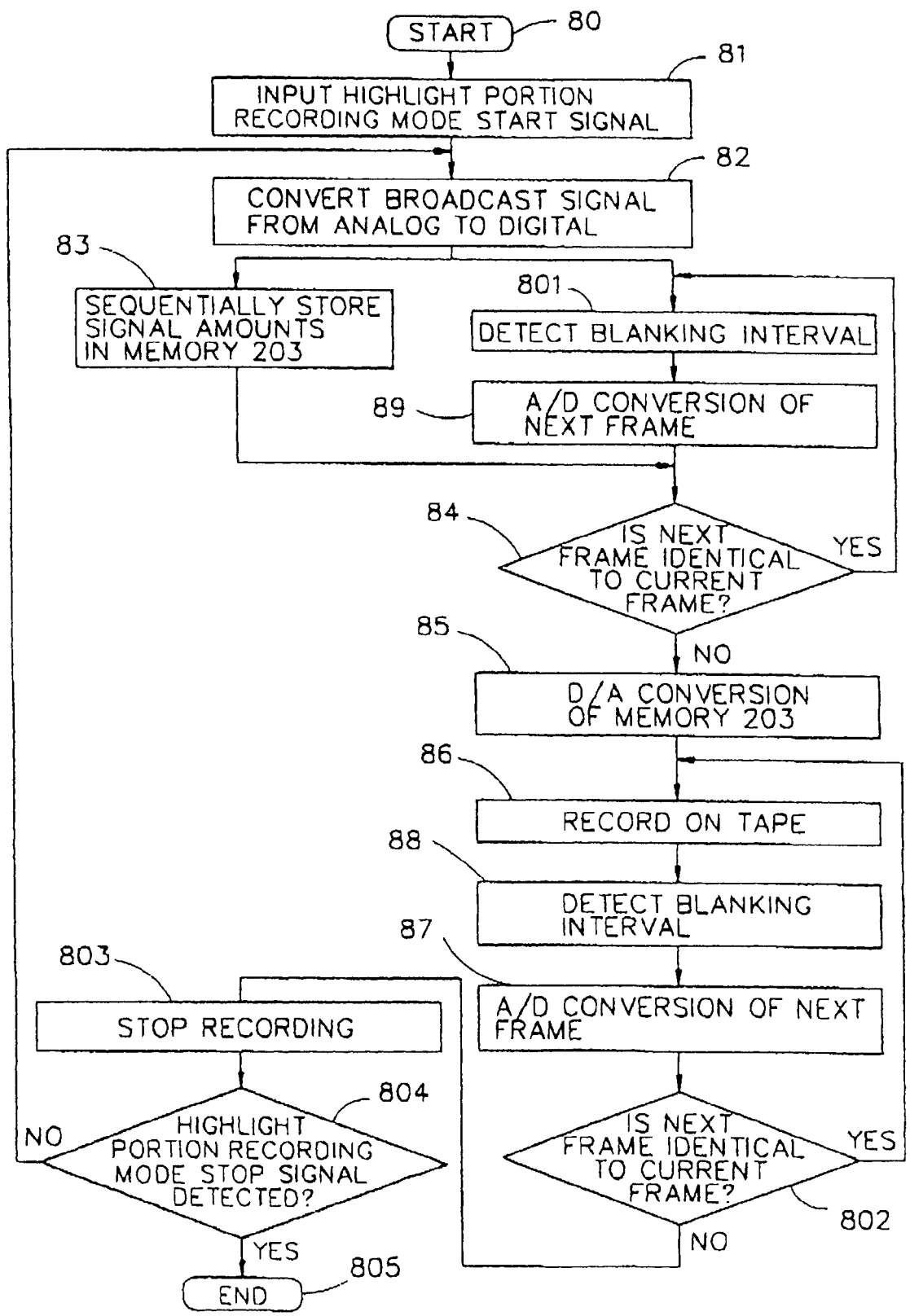
FIGS. 8 and 9 are flow charts illustrating a recording step based on an image motion detection.

A fourth embodiment is illustrated in FIG. 8 which recognizes a slow motion picture as a highlight portion. When the highlight portion recording mode start signal is inputted into the key input unit 207, at Step 81, the broadcast signal selected by the tuner 201 is converted into a digital signal by the analog/digital converter 202, at Step 82, and a predetermined amount of the digital signal is stored into the memory 203 (for example, the amount is as much as 30 seconds), at Step 83, and the highlight portion detection unit 206 detects the output signal from the analog/digital converter 202 and detects a blanking interval, at Step 801.

When the highlight portion detection unit 206 detects a blanking interval between frames, the frame after the blanking interval is compared with the frame before the blanking interval as stored in the memory 203 as to whether they are identical to each other, at Step 84.

As a result of the comparison, if the preceding frame and the succeeding frame to the blanking interval are not identical, the highlight portion detection unit 206 repeats the operation for detecting the next blanking interval.

However, if the next frame and the previous frame to the blanking interval as taken from the output signal of the analog/digital converter 202 are identical, the highlight portion detection unit 206 causes the data stored in the memory 203 to be outputted therefrom, at Step 85, and the digital/analog converter 204 converts the output signal from the memory 203 into an analog signal, so that the head 205 records the converted signal on the tape, at Step 86.

At this time, during the recording operation, when the highlight portion detection unit 206 detects the output signal from the analog/digital converter 202 and detects a blanking interval, it is judged whether the next frame and the previous frame to the next blanking interval are identical, at Step 802.

As a result of the comparison, if the next frame and the previous frame to the next blanking interval are identical, the highlight portion detection unit 206 stores the output signal from the analog/digital converter 202 into the memory 203 by a predetermined amount, and the stored data is outputted and is converted into an analog signal by the digital/analog converter 204, so that the converted signal is recorded by the head 205 on the tape. The above-described operations are repeated so long as the compared frames are identical.

In addition, as a result of the comparison, if the next frame and the previous frame to the blanking interval are not identical, the highlight portion detection unit 206 causes the data stored in the memory 203 to not be outputted therefrom, thus stopping the recording operation, so that the operation mode becomes a recording ready mode, at Step 803.

Thereafter, when a highlight portion recording mode stop signal is inputted from the key input unit 207, the highlight portion detection unit 206 stops all the recording operations, at Step 804.

Figure 9:
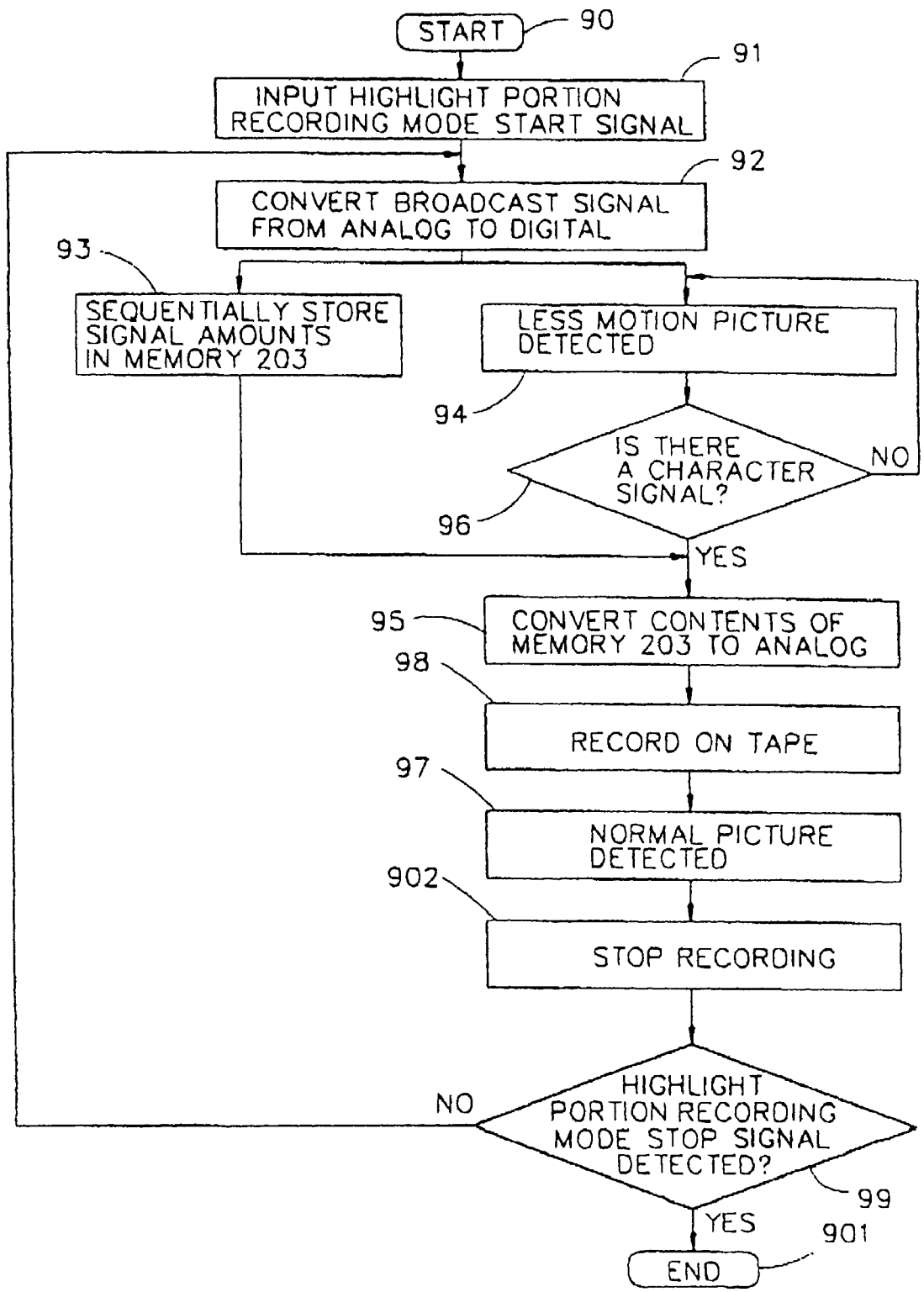

A fifth embodiment is shown in FIG. 9.

When a highlight scene corresponding to a sports broadcast signal is changed to a less motion signal in order to view a more detailed picture, the scene in which there is less motion is recognized as a highlight portion, so that it is possible to record the highlight portion.

The phrase "less motion picture" refers to a series of non-active images in the broadcast signal. This state can be determined using motion vector analysis, two examples of which are disclosed in U.S. Pat. No. 5,053,876 to Blissett et al. and U.S. Pat. No. 5,210,559 to Ohki.

When a highlight portion recording mode start signal is inputted from the key input unit 207, at Step 91, the analog/digital converter 202 converts the broadcast signal selected by the tuner 201 into a digital signal, at Step 92, and the highlight portion detection unit 206 detects a less motion picture and stores a signal corresponding to the less motion picture into the memory 203 by a predetermined amount (the amount is as much as about 30 seconds), at Step 93).

When the highlight portion detection unit 206 detects a less motion picture, it is judged whether the broadcast signal includes a character signal. In this regard, it is judged whether the signal exhibits a white color level within a preselected range, at Step 96. A character signal can be detected by optical character recognition. Alternatively, as in the preferred embodiment, a character signal is determined by detecting a white color level signal indicative of a character signal.

When there is no character signal, the highlight portion detection unit 206 continues to search for a slow motion picture from the output signal from the analog/digital converter 202, at Step 94.

If the character signal is detected from the slow motion picture, the highlight portion detection unit 206 controls the memory 203 to output a signal stored therein, and the outputted signal is converted into an analog signal, at Step 95, so that the converted signal is recorded on the tape by the head 205, at Step 98.

At this time, while the highlight portion is being recorded, the highlight portion detection unit 206 checks the output signal from the analog/digital converter 202 for thus detecting a motion therein.

When the normal motion scene is detected, at Step 97, the highlight portion detection unit 206 recognizes that the highlight portion is ended, thus stopping the highlight portion recording operation, at Step 902. In the recording ready mode, the output signal from the analog/digital converter 202 is checked for whether there is a slow motion image scene, at Step 94.

Thereafter, when a highlight portion recording mode stop signal is inputted from the key input unit 207, the highlight portion detection unit 206 stops all the recording operations, at Step 99.

As described above, the method for automatically selecting and recording a highlight portion according to the present invention is capable of automatically selecting and recording a desired portion of the program without recording all the program, thus significantly reducing a tape consumption and a recording time.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for automatically selecting and recording highlight portions of a broadcast signal with audio and video signal portions, said highlight portions representing the most significant portions of a broadcast program, the apparatus comprising:

an analog/digital converter for converting a broadcast signal having audio and video signal portions into digital data;

a highlight portion detection unit coupled to an output of the analog/digital converter for detecting a highlight portion in the digital data converted by the analog/digital converter and outputting a control signal when a highlight portion is detected;

a memory coupled to the output of the analog/digital converter and to the highlight portion detection unit, for storing an amount of the digital data converted by the analog/digital converter, and for outputting, in response to the control signal outputted by the highlight portion detection unit, the stored digital data;

a digital/analog converter coupled to an output of the memory, the digital/analog converter for converting the digital data outputted from the memory into an analog signal; and a recording unit coupled to an output of the digital/analog converter, the recording unit for recording the analog signal converted by the digital/analog converter, wherein the highlight portion detection unit detects a highlight portion by calculating a weighted average level of an audio signal portion in the digital data converted by the analog/digital converter and setting the weighted average level as an audio reference level in accordance with said detection and periodically judging whether an audio signal level of an audio signal portion in the digital data converted by the analog/digital is comparatively greater by a predetermined amount than the thusly set audio reference level.

2. The apparatus of claim 1, wherein, when the highlight portion detection unit judges that an audio signal level in the succeeding digital data is neither comparatively greater than the audio reference level by a first predetermined amount nor comparatively less than the audio reference level by a second predetermined amount, the highlight portion detection unit calculates and sets a new audio reference level.

3. The apparatus of claim 1 wherein the new audio reference level is calculated as a weighted average of the audio signal level according to the formula:

$$\text{New Audio Reference Level} = \frac{\text{Present Audio Reference Level} \times (59 + n) + \text{Input Audio Level}}{(60 + n)};$$

where "n" is an arbitrarily set number.

4. A method for automatically selecting and recording highlight portions from a broadcast signal with audio and video signal portions in an apparatus including a receiver, a highlight portion detection unit and a recorder, said highlight portions representing the most significant portions of a broadcast program, comprising:

inputting, via the receiver, a broadcast signal having audio and video signal portions;

detecting, via the highlight portion detection unit, a highlight portion in the inputted broadcast signal; and recording, via the recorder, the detected highlight portion of the inputted broadcast signal, wherein the step of detecting the highlight portion comprises:

detecting, via the highlight portion detection unit, an audio signal level from the audio signal portion of the inputted broadcast signal;

setting, via the highlight portion detection unit, a certain audio signal level as an audio reference level;

periodically comparing, via the highlight portion detection unit, the detected audio signal level with the set audio reference level; and judging, via the highlight portion detection unit, whether the detected audio signal level is comparatively greater or lesser than or equal to the audio reference level, and wherein the audio reference level is set according to the formula:

$$\text{New Audio Reference Level} = \frac{\text{Present Audio Reference Level} \times (59+n) + \text{Input Audio Level}}{(60+n)};$$

where "n" is an arbitrarily set number. GIBSON

5. A method for automatically selecting and recording highlight portions from a broadcast signal with audio and video signal portions in an apparatus including a receiver, a highlight portion detection unit and a recorder, said highlight portions representing the most significant portions of a broadcast program, comprising:

inputting, via the receiver, a broadcast signal having audio and video signal portions;

detecting, via the highlight portion detection unit, a highlight portion in the inputted broadcast signal; and recording, via the recorder, the detected highlight portion of the inputted broadcast signal, wherein the step of detecting the highlight portion comprises:

detecting, via the highlight portion detection unit, an audio signal level from the audio signal portion of the inputted broadcast signal;

setting, via the highlight portion detection unit, a certain audio signal level as an audio reference level;

periodically comparing, via the highlight portion detection unit, the detected audio signal level with the set audio reference level; and judging, via the highlight portion detection unit, whether the detected audio signal level is comparatively greater or lesser than or equal to the audio reference level, and wherein the method further comprises when the detected audio signal level is neither comparatively greater than the audio reference level by a first predetermined amount nor comparatively less than the audio reference level by a second predetermined amount, calculating a new weighted average of the detected audio signal level and setting the newly calculated weighted average as a new audio reference level.

6. The method of claim 5, further comprising:

detecting, via the highlight portion detection unit, a highlight portion stop code in the inputted broadcast signal; and recognizing, via the highlight portion detection unit, the detected highlight portion stop code as indicating the end of a highlight portion in the inputted broadcast signal.

7. The method of claim 5, wherein the recording step is performed until a predetermined time has elapsed beginning from when the highlight portion start code was detected.

* * * * *